US012196128B2

(12) United States Patent
Kase et al.

(10) Patent No.: US 12,196,128 B2
(45) Date of Patent: Jan. 14, 2025

(54) POWER GENERATION DEVICE

(71) Applicant: HONDA MOTOR CO., LTD., Tokyo (JP)

(72) Inventors: Takuo Kase, Wako (JP); Kazuki Shimozono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 168 days.

(21) Appl. No.: 17/420,855

(22) PCT Filed: Jan. 21, 2019

(86) PCT No.: PCT/JP2019/001695

§ 371 (c)(1),
(2) Date: Jul. 6, 2021

(87) PCT Pub. No.: WO2020/152755

PCT Pub. Date: Jul. 30, 2020

(65) Prior Publication Data

US 2022/0090536 A1 Mar. 24, 2022

(51) Int. Cl.
*F02B 63/04* (2006.01)
*F02B 77/00* (2006.01)

(52) U.S. Cl.
CPC ............ *F02B 63/048* (2013.01); *F02B 77/00* (2013.01); *F02B 2063/046* (2013.01)

(58) Field of Classification Search
CPC ... F02B 63/048; F02B 77/00; F02B 2063/046
(Continued)

(56) References Cited

U.S. PATENT DOCUMENTS 6,100,599 A * 8/2000 Kouchi .................. F02B 75/16 322/1
2008/0048509 A1* 2/2008 Murakami ............. F02B 63/04 181/204

(Continued)

FOREIGN PATENT DOCUMENTS

EP 0931919 A2 7/1999
EP 0931920 A2 7/1999

(Continued)

OTHER PUBLICATIONS

Japanese Office Action dated Mar. 15, 2022, English translation included, 7 pages.

(Continued)

*Primary Examiner* — Lindsay M Low
*Assistant Examiner* — Omar Morales
(74) *Attorney, Agent, or Firm* — Rankin, Hill & Clark LLP

(57) ABSTRACT

A power generation device capable of ensuring assemblability and ensuring strength/rigidity necessary when being handled, and having reduced size and weight, without using a reinforcement frame. The power generation device includes, in a casing, an alternator that generates power through driving of an engine, an inverter case that houses an inverter of the alternator, and a fuel tank that stores fuel for the engine. The device includes an upper fixing part that fixes an upper part of the fuel tank to the casing, an intermediate fixing part that fixes a lower part of the fuel tank to an upper part of the inverter case, and a lower fixing part that fixes a lower part of the inverter case to the casing.

8 Claims, 8 Drawing Sheets

(58) Field of Classification Search
USPC .......................................................... 290/1 B
See application file for complete search history.

(56) References Cited

U.S. PATENT DOCUMENTS

| | | | | |
|---|---|---|---|---|
| 2016/0281581 | A1* | 9/2016 | Takahashi | F02B 63/044 |
| 2017/0268416 | A1* | 9/2017 | Kai | F01P 5/04 |
| 2017/0271953 | A1* | 9/2017 | Koyama | H02K 9/06 |

FOREIGN PATENT DOCUMENTS

| | | | |
|---|---|---|---|
| JP | H11-200874 | A | 7/1999 |
| JP | H11-200877 | | 7/1999 |
| JP | 2004-353677 | | 12/2004 |
| WO | 2007/101388 | A1 | 9/2007 |
| WO | 2008/032414 | | 3/2008 |

OTHER PUBLICATIONS

Chinese Office Action dated Aug. 16, 2022 issued in corresponding Application No. 201980089461.1; English machine translation included, (17 pages).
European Search Report dated Oct. 7, 2021, 8 pages.
International Preliminary Report on Patentability dated Jul. 22, 2021, 6 pages.
International Search Report, Date of mailing: Apr. 16, 2019 (Apr. 16, 2019), 1 page.
International Preliminary Report on Patentability, PCT/IPEA/409, 6 pages.

* cited by examiner

POWER GENERATION DEVICE

TECHNICAL FIELD

The present invention relates to a power generation device, and more particularly to a power generation device capable of having reduced size and weight without using a reinforcement frame.

BACKGROUND ART

Heretofore, a power generation device that rotates an alternator by rotation of an output shaft of an engine to generate power has been known.

In the power generation device, an inverter to control the alternator is mounted, and the inverter is accompanied by heat generation and therefore needs to radiate heat.

As this power generation device, a conventional technology is disclosed in which, for example, an engine and an alternator are integrated and covered with a shroud and a fan cover to form a power generation unit, and reinforcement frames are provided on opposite right and left sides of a fuel tank and an inverter unit disposed below this fuel tank (see Patent Literature 1, for example).

CITATION LIST

Patent Literature

[Patent Literature 1]
Japanese Patent Laid-Open No. 2004-353677

SUMMARY OF INVENTION

Technical Problem

In the above conventional technology, reinforcement frames are provided in a casing, so that strength/rigidity necessary when being handled can be ensured. There are advantages that the necessary strength/rigidity does not have to be ensured with the casing itself, and a thickness and a degree of freedom in shape can be ensured.

However, since the reinforcement frames are provided, a weight of a power generation device increases. Additionally, a space where the reinforcement frames are to be provided needs to be acquired, and hence, there is a problem that a size of the casing increases.

On the other hand, if the reinforcement frames are not used, it is difficult to make auxiliary equipment in the casing independent without the casing. In this state, suitable assemblability is to be ensured.

The present invention has been developed in view of the above respect, and an object thereof is to provide a power generation device capable of ensuring assemblability and ensuring strength/rigidity necessary when being handled, and having reduced size and weight, without using a reinforcement frame.

Solution to Problem

To achieve the above object, an aspect of the present invention is directed to a power generation device including, in a casing, an alternator that generates power through driving of an engine, an inverter case that houses an inverter of the alternator, and a fuel tank that stores fuel for the engine, the device including an upper fixing part that fixes an upper part of the fuel tank to the casing, an intermediate fixing part that fixes a lower part of the fuel tank to an upper part of the inverter case, and a lower fixing part that fixes a lower part of the inverter case to the casing.

According to the aspect of the present invention, the fuel tank is supported in the casing by the upper fixing part and the intermediate fixing part, and the inverter case is supported in the casing by the intermediate fixing part and the lower fixing part, so that the fuel tank and the inverter case can be used as parts of a reinforcement member. Consequently, the fuel tank and the inverter case can be fixed to the casing without using an auxiliary frame.

In the above configuration, the upper fixing part includes an upper fixing bracket provided in the upper part of the fuel tank, an upper tank mount member attached to a support part formed in the upper fixing bracket, and a collar member extending through the support part and the upper tank mount member, the collar member being supported in the casing.

According to the aspect of the present invention, the collar member of the upper fixing part can fix the fuel tank to the casing via the support part of the upper fixing bracket provided in the fuel tank and the upper tank mount member attached to this support part.

In the above configuration, the intermediate fixing part includes a lower fixing bracket provided in the lower part of the fuel tank, and a lower tank mount member attached to the lower fixing bracket, and is configured to fasten and fix a front plate of the casing and the inverter case via the lower fixing bracket and the lower tank mount member.

According to the aspect of the present invention, the front plate and the inverter case are fastened via the lower fixing bracket of the intermediate fixing part and the lower tank mount member attached to the lower fixing bracket, so that the lower part of the fuel tank and the upper part of the inverter case can be fixed to the casing.

In the above configuration, the upper fixing part and the intermediate fixing part are provided at positions shifted from each other in a front-rear direction of the casing, the lower fixing bracket is attached to face in a direction in which rotation moment of external force works if the external force is applied to the fuel tank, and a fastening direction of the front plate and the inverter case coincides with the direction in which the rotation moment works.

The aspect of the present invention can include a structure where even if the external force is applied to the fuel tank, a fastened portion is hard to loosen.

In the above configuration, the lower fixing part includes a lower receiving member provided in the lower part of the inverter case, and the lower receiving member is supported on an upper surface of a bottom plate of the casing.

According to the aspect of the present invention, a lower surface of the inverter case can be supported by the lower receiving member, and the lower fixing part can fix the inverter case to the casing, together with the intermediate fixing part.

In the above configuration, the upper fixing part includes a fixing member made of an elastic material fixing a refueling port of the fuel tank to the upper part of the fuel tank.

According to the aspect of the present invention, since the fuel tank is fixed to the refueling port by use of the fixing member as the upper fixing part, the fuel tank and the inverter case can be used as parts of the reinforcement member, and the fuel tank and the inverter case can be fixed to the casing without using the auxiliary frame.

Advantageous Effects of Invention

According to an aspect of the present invention, a fuel tank is supported in a casing by an upper fixing part and an intermediate fixing part, and an inverter case is supported in the casing by the intermediate fixing part and a lower fixing part, so that the fuel tank and the inverter case can be used as parts of a reinforcement member. Consequently, the fuel tank and the inverter case can be fixed to the casing without using an auxiliary frame.

As a result, a space where a reinforcement frame is to be placed becomes unnecessary, and formation of a reinforcing rib of the casing or the like becomes unnecessary, so that the casing can be reduced in size. Furthermore, the reinforcement frame becomes unnecessary, and hence, a power generation device can be reduced in weight. Furthermore, for example, a fuel pipe of the fuel tank, a harness for an inverter or the like can be easily recognized from outside.

DESCRIPTION OF EMBODIMENT

Hereinafter, embodiments of the present invention will be described with reference to the drawings.

Figure 1:
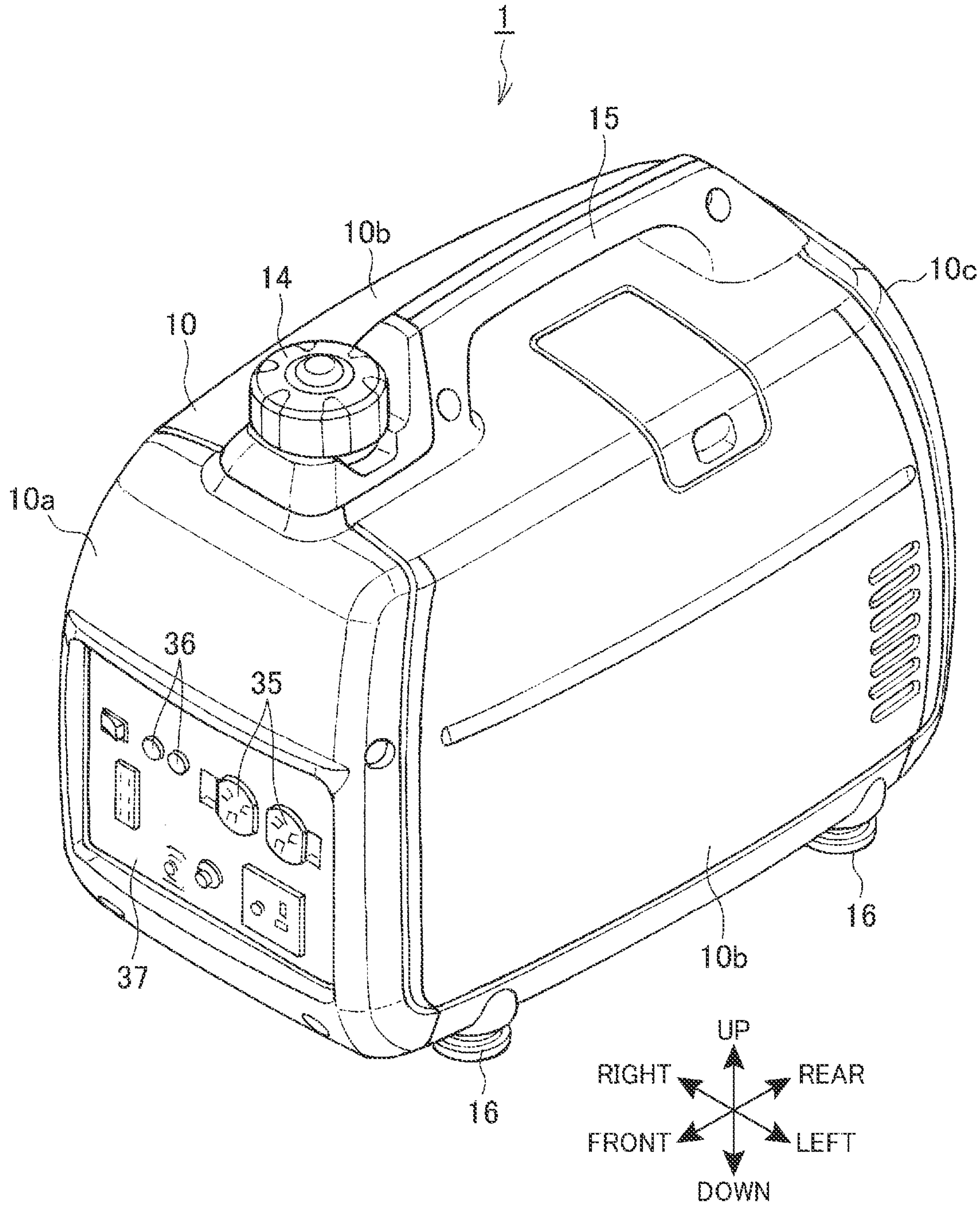
FIG. 1 is a schematic perspective view showing an embodiment of a power generation device according to the present invention.
Figure 2:
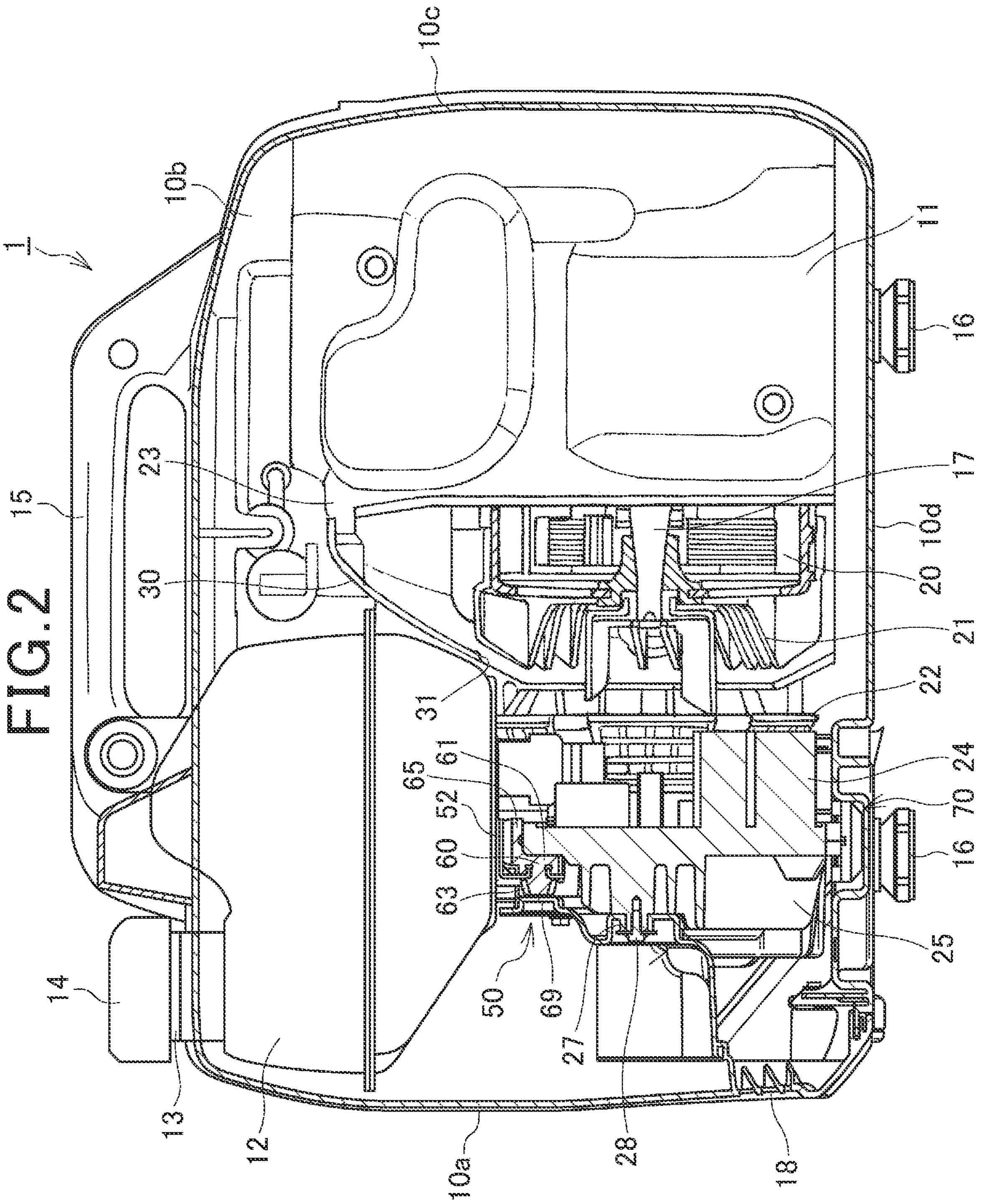
FIG. 2 is a cross-sectional view showing the power generation device of the present embodiment.
Figure 3:
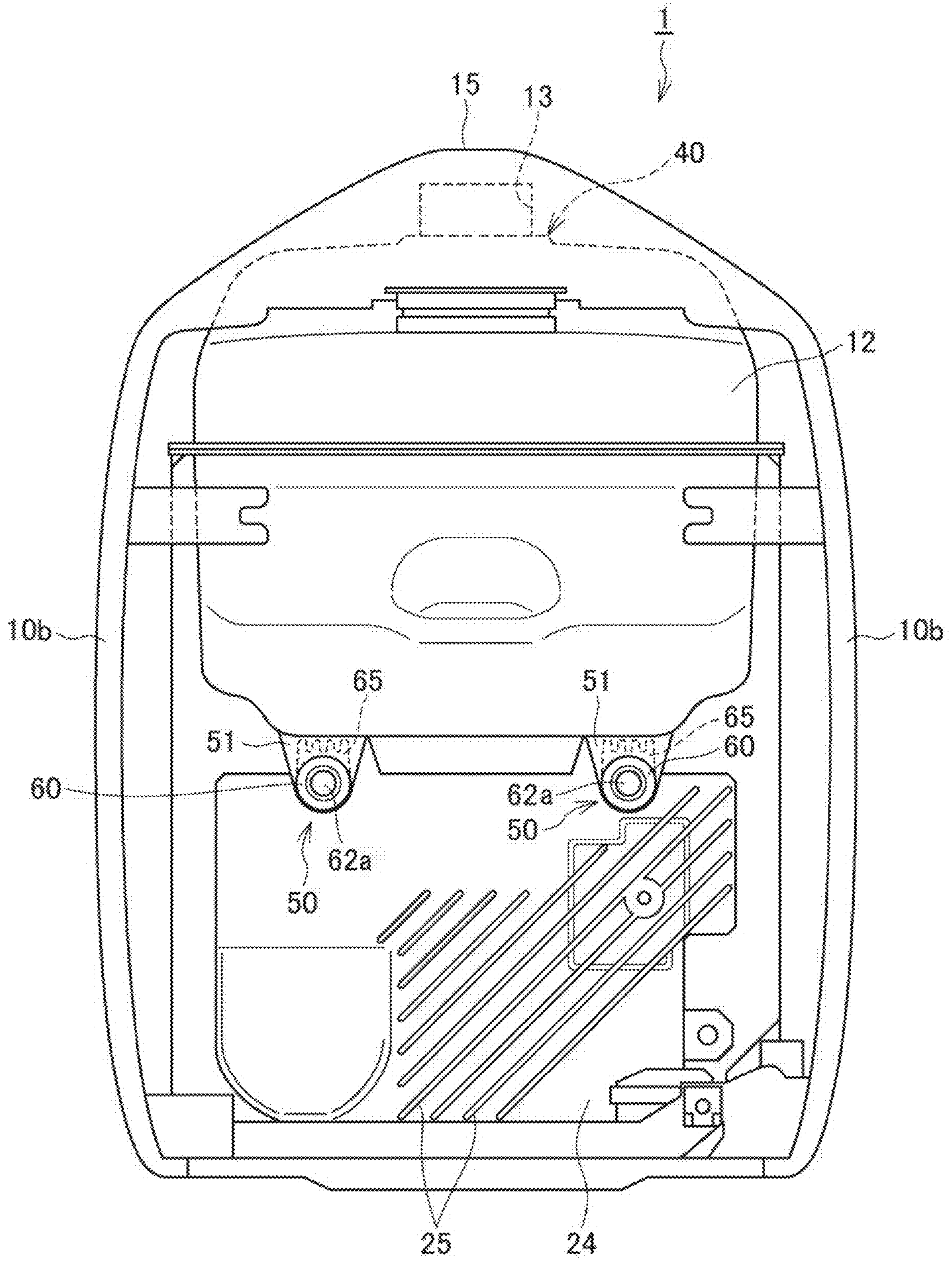
FIG. 3 is a front view showing an interior of the power generation device of the present embodiment.
Figure 4:
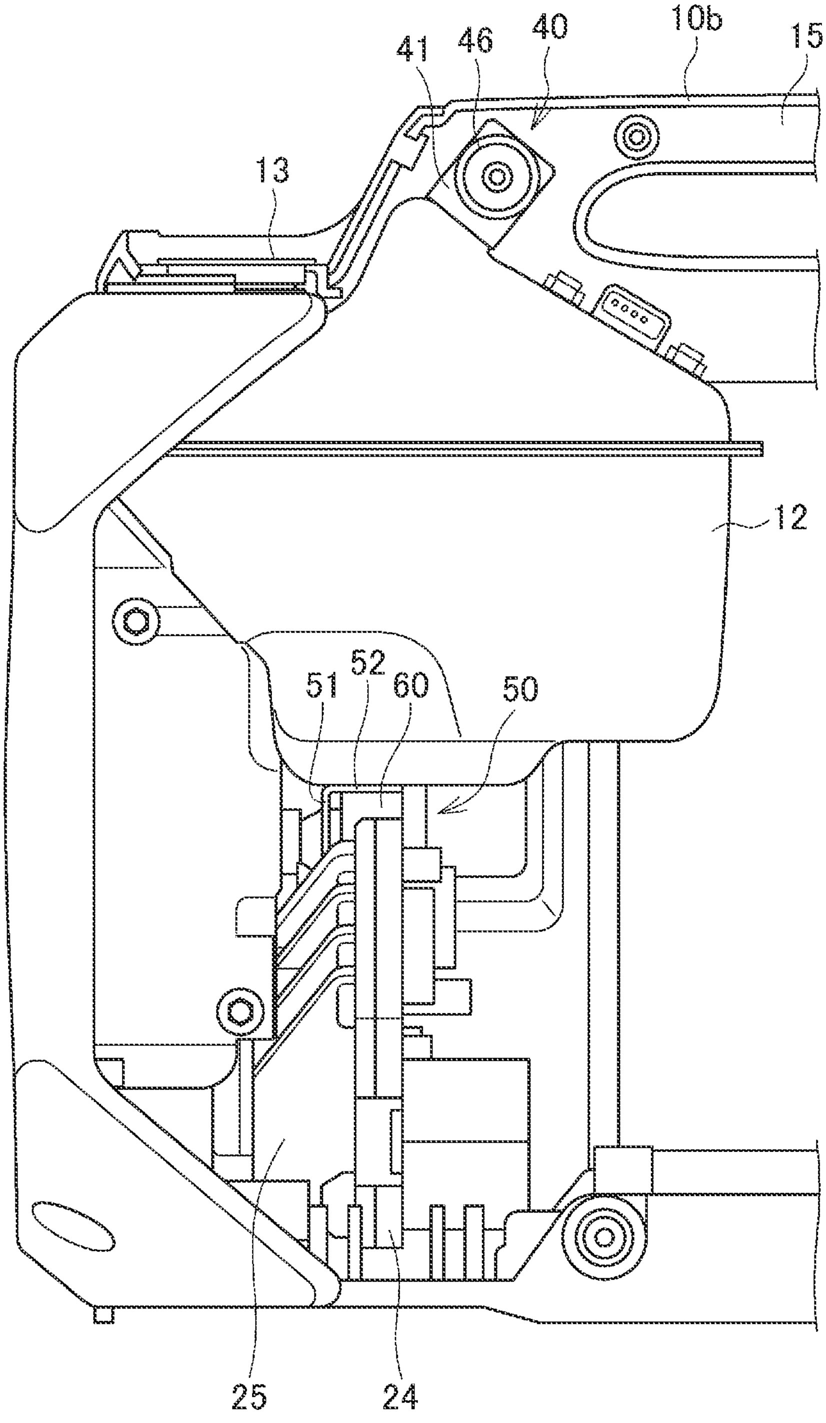
FIG. 4 is a side view of a part showing the interior of the power generation device of the present embodiment.

FIG. 1 is a perspective view showing an appearance in an embodiment of a power generation device according to the present invention. FIG. 2 is a cross-sectional view of the power generation device. FIG. 3 is a front view showing an interior of the power generation device of the present embodiment. FIG. 4 is a side view of a part showing the interior of the power generation device of the present embodiment.

As shown in FIG. 1 and FIG. 2, in a first embodiment, a power generation device 1 includes an approximately rectangular parallelepiped casing 10 made of a resin. The casing 10 includes a front plate 10*a* located on a front side (a left side in FIG. 2), a pair of side plates 10*b* located on opposite right and left sides, a rear plate 10*c* located on a rear side (a right side in FIG. 2), and a bottom plate 10*d* located on a downside.

An engine 11 is housed on the rear side (the right side in FIG. 2) in the casing 10. Furthermore, a fuel tank 12 is housed on the front side (the left side in FIG. 2) in the casing 10. A refueling port 13 of the fuel tank 12 protruding outward from the casing 10 is provided in a top plate of the casing 10. A refueling cap 14 to open/close the refueling port 13 is detachably attached to the refueling port 13.

Also, an inverter case 24 in which an inverter (not shown in the drawing) including a circuit substrate is housed is disposed below the fuel tank 12.

Furthermore, a handle 15 is provided on an upper surface of the casing 10, and a plurality of legs 16 supporting the casing 10 are attached to a lower surface of the casing 10.

The handle 15 is formed by joining the pair of side plates 10*b*.

An alternator 20 is attached to an output shaft 17 protruding forward from the engine 11, the alternator being coaxial with the output shaft 17. Also, a fan 21 is coaxially attached to the output shaft 17 in front of the alternator 20. A recoil 22 to start the engine 11 is disposed in front of the fan 21.

Then, the alternator 20 is rotated and driven to generate power through driving of the engine 11, and the fan 21 is rotated and driven to take in external air of the casing 10 and to send the air on an engine 11 side.

Inside the casing 10 and outside the engine 11, a shroud 23 that guides, around the engine 11, the air sent by the fan 21 is disposed.

At a front end of the shroud 23, a fan cover 30 that covers the alternator 20 and the fan 21 is disposed. The fan cover 30 is formed in a tapered shape so that a front side of the cover has a smaller diameter, and a ventilation opening 31 is formed in a front end portion of the fan cover 30. The ventilation opening 31 is formed approximately concentrically with a rotary shaft of the engine 11.

A control panel 37 in which a power outlet 35, a manual operation button 36 and others are arranged is attached to a lower part of the front plate 10*a* of the casing 10.

Furthermore, in each of the side plates 10*b* in a part of a front surface of the casing 10 below the control panel 37, an intake port 18 through which outside air is taken into the casing 10 is formed, and in a rear surface of the casing 10, an exhaust port (not shown) is formed.

Then, the engine 11 is driven to rotate and drive the fan 21, and thereby, the exterior air of the casing 10 is taken inward through the intake port 18, and flows into the fan cover 30 via the ventilation opening 31. While the air flows through a space between the engine 11 and the shroud 23, the engine 11 is cooled. Afterward, the air is exhausted to outside through the exhaust port.

Next, description will be made in detail as to a fixing structure for the fuel tank 12 and the inverter case 24.

Figure 5:
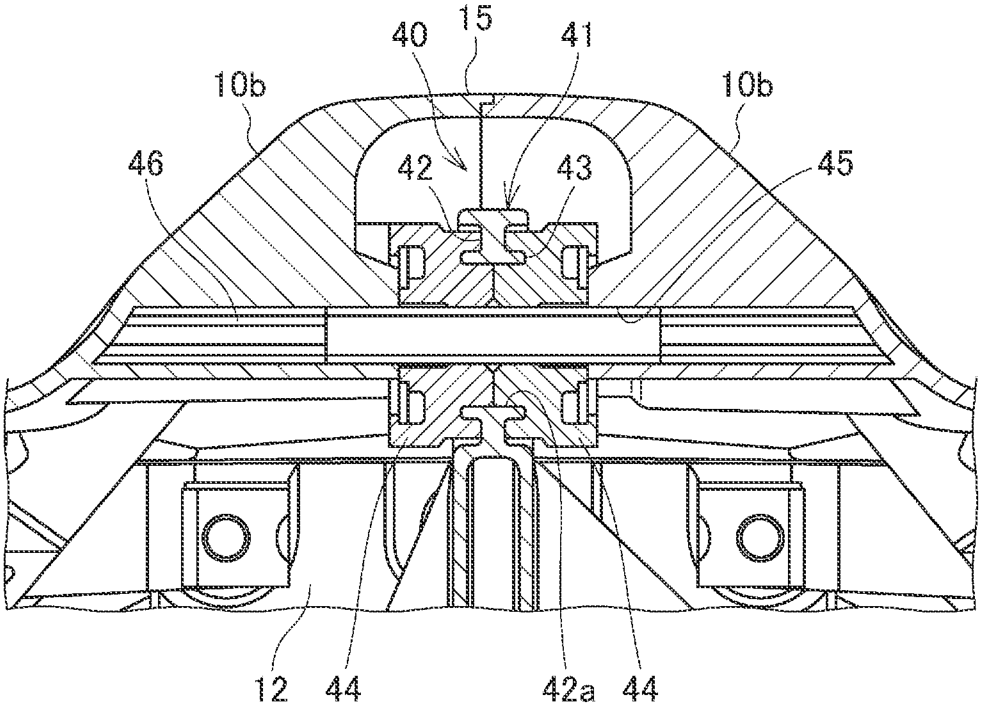
FIG. 5 is a schematic cross-sectional view showing a structure of an upper fixing part of the present embodiment.
Figure 6:
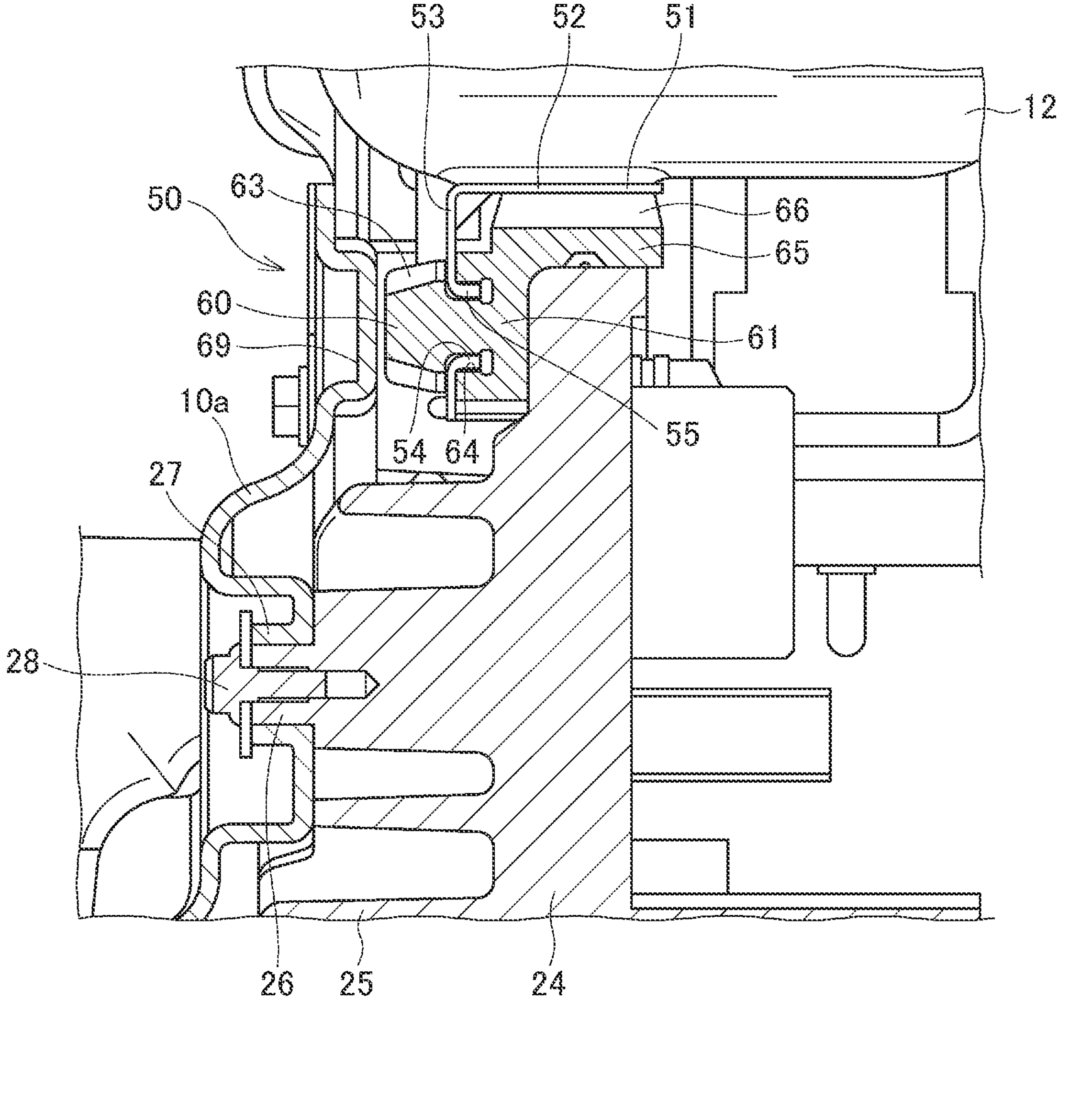
FIG. 6 is a schematic cross-sectional view showing a structure of an intermediate fixing part of the present embodiment.
Figure 7:
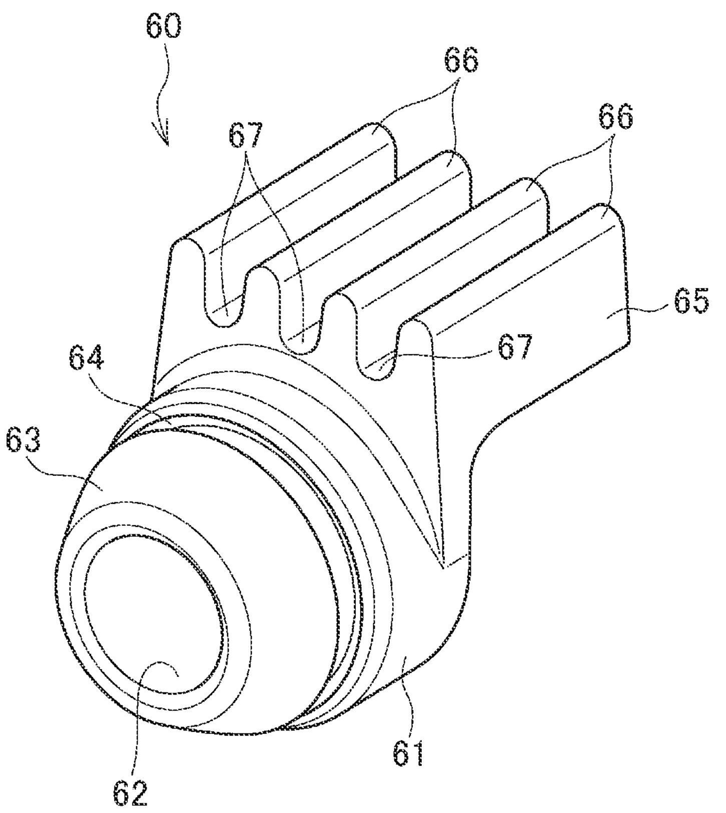
FIG. 7 is a perspective view showing a lower tank mount member of the present embodiment.
Figure 8:
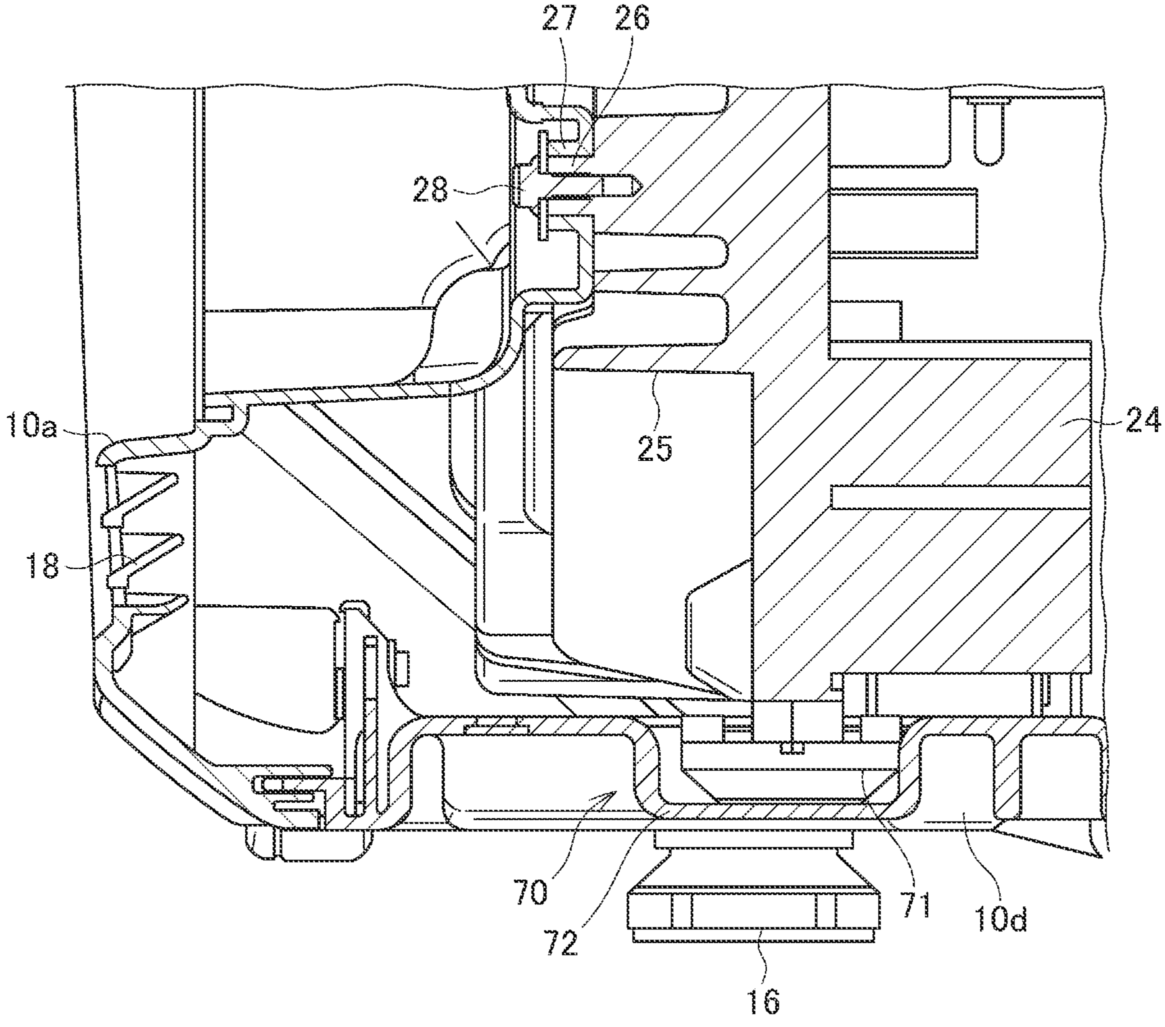
FIG. 8 is a schematic cross-sectional view showing a structure of a lower fixing part of the present embodiment.

FIG. 5 is a schematic cross-sectional view showing a structure of an upper fixing part. FIG. 6 is a schematic cross-sectional view showing a structure of an intermediate fixing part. FIG. 7 is a perspective view showing a lower tank mount member of the intermediate fixing part. FIG. 8 is a schematic cross-sectional view showing a structure of a lower fixing part.

First, the structure of the upper fixing part will be described.

As shown in FIG. 5, an upper fixing bracket 41 forming an upper fixing part 40 is integrally provided at an upper end of the fuel tank 12. The upper fixing bracket 41 is disposed at a position corresponding to the handle 15 of the casing 10.

The upper fixing bracket 41 includes an engaging portion 42, or support part, which is formed in an annular shape. The engaging portion 42 includes a flange portion 43 formed at an inner circumferential edge, and the engaging portion 42 has a cross section formed in an approximately H-shape.

In a hole portion 42*a* of the engaging portion 42 of the upper fixing bracket 41, a pair of upper tank mount members 44 are provided to sandwich the flange portion 43 of the engaging portion 42 from opposite sides of the engaging portion. Each of the upper tank mount members 44 is made of an elastic material such as a rubber.

A through hole 45 extending through the casing 10 in a right-left direction is formed in each of a handle 15 part of the casing 10 and a center between the upper tank mount members 44. A cylindrical collar member 46 is inserted into the through hole 45.

That is, the upper fixing part 40 is configured such that a support part of the upper fixing bracket 41 provided in the fuel tank 12 is supported, via the pair of upper tank mount members 44 sandwiching this support part, by the collar member 46 inserted into the through hole 45. Consequently, the fuel tank 12 is fixed in a state of being hung from the handle 15 part of the casing 10 by the collar member 46 extending through the through hole 45 in the casing 10.

Next, the structure of the intermediate fixing part will be described.

As shown in FIG. 6, a lower fixing bracket 51 forming an intermediate fixing part 50 is integrally provided on a lower surface side of the fuel tank 12. Two lower fixing brackets 51 are provided via a predetermined interval in a right-left direction of the fuel tank 12. The respective lower fixing brackets 51 have a similar configuration, and hence, one of the lower fixing brackets 51 will be described.

The lower fixing bracket 51 includes a lower fixing piece 52 bonded to a lower surface of the fuel tank 12, and a lower support piece 53 extending downward from the lower fixing piece 52 on a front plate 10*a* side, and in the lower support piece 53, a lower opening 54 is formed. At an inner circumferential edge of the lower opening 54, a supporting flange 55 extending rearward is integrally formed.

As shown in FIG. 7, a lower tank mount member 60 forming the intermediate fixing part 50 is disposed between a lower part of the fuel tank 12 and an upper part of the inverter case 24, and the lower tank mount member 60 is made of an elastic material such as a rubber.

The lower tank mount member 60 includes a cylindrical body part 61, and in the body part 61, a support hole 62 extending through the body part in a front-rear direction is formed. On a front plate 10*a* side of the body part 61, a tapered portion 63 having a tip end formed in a tapered shape is provided, and in a central portion of the body part 61 in the front-rear direction, an annular groove 64 into which the supporting flange 55 of the lower fixing bracket 51 is to be inserted is formed.

That is, the lower tank mount member 60 is attached to the lower fixing bracket 51 of the fuel tank 12 via the annular groove 64.

Furthermore, a buffer part 65 extending rearward is provided above and behind the body part 61 of the lower tank mount member 60. In the present embodiment, the buffer part 65 has a shape including four protrusions 66 and three recesses 67, each recess being formed between the respective protrusions 66. The buffer part 65 is disposed so that an upper part of the buffer part abuts on the lower surface of the fuel tank 12, and a lower part of the buffer part 65 abuts on an upper end portion of the inverter case 24. The buffer part 65 located between the fuel tank 12 and the inverter case 24 has a function of absorbing shock between the fuel tank 12 and the inverter case 24.

A recess 69 bulging out toward the inside of the casing 10 is formed at a position corresponding to the lower tank mount member 60 in the front plate 10*a*.

The recess 69 faces a tip end portion of the tapered portion 63 of the lower tank mount member 60, and a bolt 62*a* is inserted from the recess 69 of the rear plate 10*c* through the support hole 62 of the lower tank mount member 60, and fastened to the inverter case 24. Consequently, the lower part of the fuel tank 12 and the upper part of the inverter case 24 are fixed to the front plate 10*a* via the lower tank mount member 60.

That is, the intermediate fixing part 50 is configured to fasten and fix the front plate 10*a* to the inverter case 24 with the bolt 62*a*, via the lower fixing bracket 51 and the lower tank mount member 60 attached to the lower fixing bracket 51. Consequently, the fuel tank 12 and the inverter case 24 are integrated and fixed to the front plate 10*a*.

Furthermore, in the present embodiment, a fixed position of the fuel tank 12 by the upper fixing bracket 41 and the upper tank mount members 44 and a fixed position by the lower fixing bracket 51 and the lower tank mount member 60 are positions shifted from each other in the front-rear direction of the casing 10.

For example, if external force is applied to a refueling cap 14 part of the fuel tank 12 from above, rotation moment directed downward about the engaging portion 42 of the upper fixing bracket 41 described above is generated in the fuel tank 12.

In this case, in the present embodiment, the lower fixing bracket 51 is attached to face in a direction in which the rotation moment works, and the direction in which the rotation moment works coincides with a fastening direction with the bolt 62*a*. Consequently, even if the external force is applied, a fastened portion with the bolt 62*a* is hard to loosen.

On the front plate 10*a* side of the inverter case 24, a plurality of inclined and protruding cooling fins 25 are formed. Fixing protrusions 26 protruding toward the front plate 10*a* side are formed on parts of the cooling fins 25.

At a position corresponding to each of the fixing protrusions 26 of the front plate 10*a*, a screw hole portion 27 is formed, and the front plate 10*a* and the inverter case 24 are fastened and fixed with a bolt 28 through the screw hole portion 27.

Next, the structure of the lower fixing part will be described.

As shown in the drawing, a lower fixing part 70 includes a lower receiving member 71 attached to a lower surface side of the inverter case 24.

In the bottom plate 10*d* of the casing 10, a receiving portion 72 is formed in a recess shape, and the lower receiving member 71 is mounted on an upper surface of this receiving portion, to support the lower receiving member 71.

Consequently, a lower surface of the inverter case 24 can be supported by the lower receiving member 71, and the lower fixing part 70 can fix the inverter case 24 to the casing 10, together with the intermediate fixing part 50.

Next, an operation of the present embodiment will be described.

In the present embodiment, when the recoil 22 is operated to start the engine 11, the output shaft 17 is rotated through the driving of the engine 11, and the alternator 20 is driven to generate power.

Simultaneously, the output shaft 17 is rotated, to rotate and drive the fan 21.

When the fan 21 is driven, the external air of the casing 10 is taken inside through the intake port 18, and this air flows through the ventilation opening 31 of the fan cover 30 into the fan cover 30. The air flowing into the fan cover 30 flows through the space between the engine 11 and the shroud 23 to cool the engine 11, and is then exhausted to outside through the exhaust port.

Furthermore, in a case of fixing the fuel tank 12 and the inverter case 24 to the casing 10, the support part of the upper fixing bracket 41 forming the upper fixing part 40 is sandwiched between the upper tank mount members 44, and in this state, the collar member 46 is inserted into the through hole 45. Consequently, the fuel tank 12 is fixed in the state of being hung from the handle 15 part of the casing 10.

Then, the front plate 10*a* and the inverter case 24 are fastened with the bolt 62*a*, via the lower fixing bracket 51 forming the intermediate fixing part 50 and the lower tank mount member 60 attached to the lower fixing bracket 51. Consequently, the lower part of the fuel tank 12 and the upper part of the inverter case 24 are integrally fixed to the front plate 10*a*.

Furthermore, the lower receiving member 71 forming the lower fixing part 70 is mounted on the upper surface of the receiving portion formed in the casing 10, to fix the lower part of the inverter case 24 to the casing 10.

Then, the fuel tank 12 is supported in the casing 10 by the upper fixing part 40 and the intermediate fixing part 50, and the inverter case 24 is supported in the casing 10 by the intermediate fixing part 50 and the lower fixing part 70, so that the fuel tank 12 and the inverter case 24 can be used as parts of a reinforcement member of the casing 10. Consequently, the fuel tank 12 and the inverter case 24 can be fixed to the casing 10 without using an auxiliary frame.

As described above, in the present embodiment, the power generation device includes, in the casing 10, an alternator that generates power through driving of an engine, the inverter case 24 that houses an inverter of the alternator, and the fuel tank 12 that stores fuel for the engine, the device including the upper fixing part 40 that fixes the upper part of the fuel tank 12 to the casing 10, the intermediate fixing part 50 that fixes the lower part of the fuel tank 12 to the upper part of the inverter case 24, and the lower fixing part 70 that fixes the lower part of the inverter case 24 to the casing 10.

Consequently, the fuel tank 12 is supported in the casing 10 by the upper fixing part 40 and the intermediate fixing part 50, and the inverter case 24 is supported in the casing 10 by the intermediate fixing part 50 and the lower fixing part 70, so that the fuel tank 12 and the inverter case 24 can be used as the parts of the reinforcement member of the casing 10. Consequently, the fuel tank 12 and the inverter case 24 can be fixed to the casing 10 without using the auxiliary frame.

As a result, a space where a reinforcement frame is to be placed becomes unnecessary, and formation of a reinforcing rib of the casing 10 or the like becomes unnecessary, so that the casing 10 can be reduced in size. Furthermore, the reinforcement frame becomes unnecessary, and hence, the power generation device can be reduced in weight. Furthermore, for example, a fuel pipe of the fuel tank 12, a harness for the inverter or the like can be easily recognized from outside.

Also, in the present embodiment, the upper fixing part 40 includes the upper fixing bracket 41 provided in the upper part of the fuel tank 12, the upper tank mount members 44 attached to the support part formed in the upper fixing bracket 41, and the collar member 46 extending through the support part and the upper tank mount members 44, the collar member being supported in the casing 10.

Consequently, the collar member 46 of the upper fixing part 40 can fix the fuel tank 12 to the casing 10 via the support part of the upper fixing bracket 41 provided in the fuel tank 12 and the upper tank mount member 44 attached to this support part.

Further, in the present embodiment, the intermediate fixing part 50 includes the lower fixing bracket 51 provided in the lower part of the fuel tank 12, and the lower tank mount member 60 attached to the lower fixing bracket 51, and is configured to fasten and fix the front plate 10*a* of the casing 10 and the inverter case 24 via the lower fixing bracket 51 and the lower tank mount member 60.

Consequently, the front plate 10*a* and the inverter case 24 are fastened via the lower fixing bracket 51 of the intermediate fixing part 50 and the lower tank mount member 60 attached to the lower fixing bracket 51, so that the lower part of the fuel tank 12 and the upper part of the inverter case 24 can be fixed to the casing 10.

Also, in the present embodiment, the lower fixing bracket 51 is attached to face in the direction in which the rotation moment of the external force works if the external force is applied to the fuel tank 12, and the fastening direction of the front plate 10*a* and the inverter case 24 coincides with the direction in which the rotation moment works.

Consequently, the device can include a structure where even if the external force is applied to the fuel tank 12, the fastened portion is hard to loosen.

Further, in the present embodiment, the lower fixing part 70 includes the lower receiving member 71 provided in the lower part of the inverter case 24, and the lower receiving member 71 is supported on the upper surface of the bottom plate 10*d* of the casing 10.

Consequently, the lower surface of the inverter case 24 can be supported by the lower receiving member 71, and the lower fixing part 70 can fix the inverter case 24 to the casing 10, together with the intermediate fixing part 50.

Next, another embodiment of the present invention will be described.

In the above described embodiment, the upper fixing part 40 is configured such that the support part of the upper fixing bracket 41 provided in the fuel tank 12 is supported, via the pair of upper tank mount members 44 sandwiching this support part, by the collar member 46 inserted into the through hole 45.

The present embodiment includes a configuration where members such as the upper tank mount members 44 and the upper fixing bracket 41 are not used.

That is, in the present embodiment, the fuel tank 12 is fixed by using, as the upper fixing part 40, a fixing member such as a bush made of an elastic material such as a rubber on an outer circumferential side of the refueling port 13.

Consequently, an upper part of the fuel tank that is close to a handle is not fixed, and is released.

Furthermore, the lower part of the fuel tank 12 is fixed to the upper part of the inverter case 24 by use of the lower fixing bracket 51 forming the intermediate fixing part 50 in the same manner as in the above described embodiment.

Also, in the present embodiment, as in the above embodiments, the fuel tank 12 is fixed to the outer circumferential side of the refueling port 13 by use of the fixing member as the upper fixing part 40, and hence, the fuel tank 12 and the inverter case 24 can be used as parts of the reinforcement member of the casing 10. The fuel tank 12 and the inverter case 24 can be fixed to the casing 10 without using an auxiliary frame.

As a result, a space where a reinforcement frame is to be placed becomes unnecessary, and formation of a reinforcing rib of the casing 10 or the like becomes unnecessary, so that the casing 10 can be reduced in size. Furthermore, the reinforcement frame becomes unnecessary, and hence, the power generation device can be reduced in weight. Furthermore, for example, a fuel pipe of the fuel tank 12, a harness for an inverter or the like can be easily recognized from outside.

Note that the present invention is not limited to the above embodiments, and can be variously modified and changed without departing from the scope of the present invention.

REFERENCE SIGNS LIST

1 power generation device
10 casing
10*a* front plate
10*b* side plate
10*c* rear plate
10*d* bottom plate
11 engine
12 fuel tank
14 refueling cap
15 handle
17 output shaft
20 alternator
21 fan
24 inverter case
25 cooling fin
26 fixing protrusion
27 hole portion
28 bolt
40 upper fixing part
41 upper fixing bracket
42 engaging portion
44 upper tank mount member
46 collar member
50 intermediate fixing part
51 lower fixing bracket
60 lower tank mount member
70 lower fixing part
71 lower receiving member
72 receiving portion

The invention claimed is:

1. A power generation device comprising, in a casing, an alternator that generates power through driving of an engine, an inverter case that houses an inverter of the alternator, and a fuel tank that stores fuel for the engine, the device comprising:

an upper fixing part that fixes an upper part of the fuel tank to the casing, an intermediate fixing part that fixes a lower part of the fuel tank to an upper part of the inverter case, and a lower fixing part that fixes a lower part of the inverter case to the casing, wherein the intermediate fixing part comprises a lower fixing bracket provided in the lower part of the fuel tank, and a lower tank mount member attached to the lower fixing bracket and abutting on the upper part of the inverter case, the inverter case is configured to fasten and fix a front plate of the casing, the front plate, the lower fixing bracket, the lower tank mount member and the inverter case are fastened and fixed via a bolt, the intermediate fixing part is provided at a position shifted from the upper fixing part toward the front plate side, the upper fixing part is disposed rearward than a refueling cap of the fuel tank in a front-rear direction of the casing, and the power generation device is configured such that if external force is applied to a refueling cap part of the fuel tank from above, a direction in which rotation moment about the upper fixing part works coincides with an axial force direction of the bolt.

2. The power generation device according to claim 1, wherein the upper fixing part comprises:

an upper fixing bracket provided in the upper part of the fuel tank, an upper tank mount member attached to a support part formed in the upper fixing bracket, and a collar member extending through the support part and the upper tank mount member, the collar member being supported in the casing.

3. The power generation device according to claim 2, wherein the inverter case is configured to fasten and fix a front plate of the casing.

4. The power generation device according to claim 3, wherein the upper fixing part and the intermediate fixing part are provided at positions shifted from each other in the front-rear direction of the casing, and are configured such that the lower fixing bracket is attached to face in a direction in which rotation moment of external force works if the external force is applied to the fuel tank, and a fastening direction of the front plate and the inverter case coincides with the direction in which the rotation moment works.

5. The power generation device according to claim 2, wherein the lower fixing part comprises a lower receiving member provided in the lower part of the inverter case, and the lower receiving member is supported on an upper surface of a bottom plate of the casing.

6. The power generation device according to claim 1, wherein the lower fixing part comprises a lower receiving member provided in the lower part of the inverter case, and the lower receiving member is supported on an upper surface of a bottom plate of the casing.

7. The power generation device according to claim 1, wherein the upper fixing part comprises a fixing member made of an elastic material fixing a refueling port of the fuel tank to the upper part of the fuel tank.

8. The power generation device according to claim 1, wherein the lower tank mount member includes a body part, and the body part has a support hole extending through the body part, the bolt is inserted from the casing through the support hole of the lower tank mount member and is fastened to the inverter case, whereby the lower part of the fuel tank and the upper part of the inverter case are fixed to the casing via the lower tank mount member.

* * * * *